United States Patent [19]

Gajek et al.

[11] Patent Number: 5,443,134
[45] Date of Patent: Aug. 22, 1995

[54] HYDRAULIC ACTUATING DEVICE FOR BRAKES AND GEARSHIFTS OF BICYCLES OR THE LIKE

[75] Inventors: Joachim Gajek, Würzburg; Hannsjörg Stumpf, Schweinfurt, both of Germany

[73] Assignee: Fichtel & Sachs AG, Schweinfurt, Germany

[21] Appl. No.: 163,128

[22] Filed: Dec. 7, 1993

[30] Foreign Application Priority Data

Dec. 10, 1992 [DE] Germany ............... 42 41 521.7

[51] Int. Cl.⁶ ............................................. B60T 11/16
[52] U.S. Cl. .................................. 188/344; 74/473 R; 74/502.2; 74/502.6; 74/502; 74/501.5 H; 92/137; 188/2 D; 188/24.11
[58] Field of Search ............... 74/501.5, 473 R, 502.4, 74/502.6, 502, 501.5 H, 502.2, 501.5 R; 92/137; 280/274, 281.1; 188/2 D, 24.11, 344

[56] References Cited

U.S. PATENT DOCUMENTS

| | | | |
|---|---|---|---|
| 2,109,114 | 2/1938 | Kerr | 74/502 |
| 2,424,198 | 7/1947 | Tauscher | 74/501.5 H |
| 3,899,056 | 8/1975 | Doerr | 188/344 |
| 4,261,221 | 4/1981 | Kobayashi | 74/502.4 |
| 4,449,443 | 5/1984 | Föhl | 92/137 |
| 4,633,726 | 1/1987 | Chang | |
| 4,635,442 | 1/1987 | Bass | 188/344 |
| 4,759,230 | 7/1988 | Nagano | 74/489 |
| 4,795,003 | 1/1989 | Colgate | 188/2 D |
| 4,896,753 | 1/1990 | Sule | 188/344 |

FOREIGN PATENT DOCUMENTS

| | | |
|---|---|---|
| 444476 | 3/1942 | Belgium . |
| 2575991 | 7/1986 | France . |
| 3325970 | 1/1985 | Germany . |

*Primary Examiner*—Charles A. Marmor
*Assistant Examiner*—David Fenstermacher
*Attorney, Agent, or Firm*—Brumbaugh, Graves, Donohue & Raymond

[57] ABSTRACT

A hydraulic actuating device for brakes and gearshifts on bicycles or the like comprises an actuating lever (1b), a transmitting cylinder (1a), a flexible pressure line (9) and a receiving cylinder (1). The receiving cylinder (1) is connected with a first component (A) of a device to be actuated, and the piston (20) in the receiving cylinder (1) is mechanically connected with a second component (B) of the device by a traction cable (25).

21 Claims, 3 Drawing Sheets

HYDRAULIC ACTUATING DEVICE FOR BRAKES AND GEARSHIFTS OF BICYCLES OR THE LIKE

BACKGROUND OF THE INVENTION

The present invention relates to a hydraulic actuating device for brakes and gearshifts of bicycles or the like and, in particular, to a device of the type that includes an actuating lever, a transmitting cylinder actuated by the lever, a receiving cylinder, and a flexible pressure line communicating the receiving cylinder and the transmitting cylinder, and that converts the displacement of the transmitting cylinder by the actuation of the actuating lever into displacement of the receiving cylinder in accordance with the diameter ratio between the transmitting cylinder and the receiving cylinder.

An actuating device of the type referred to above is known from, for example, French patent application 85 00 480 (Publication No. 2 575 991). In the actuating device of French Publication No. 2,575,991, a cylinder part of a receiving cylinder is directly connected with a first brake lever part, pivotally mounted on a bicycle frame, and a piston part, which is displaceably received in the cylinder part, is directly connected with a second brake lever part. When a brake handle is actuated, a working fluid is pressurized by the displacement of a piston in a transmitting cylinder and the pressurized working fluid is delivered from the transmitting cylinder. The transmitting cylinder is connected by a hydraulic pressure line with a pressure chamber in the receiving cylinder, so that the working fluid delivered from the transmitting cylinder results in an increase in the amount of working fluid in the pressure chamber of the receiving cylinder. As a result, the piston disposed in the receiving cylinder is displaced by the pressure of the working fluid in the pressure chamber of the receiving cylinder, so that the total length of the receiving cylinder-piston arrangement is increased, whereby the first and second brake lever parts of the bicycle brake are pivoted in respect to each other and in this way result in a braking action.

The known brake device has the disadvantage that it is designed for a force transfer, for example, to the brake lever parts, only through pressure action and that it is designed specially for such brake lever parts. It is required in each case to specially design and manufacture these actuating devices structurally for use as an actuating device for other elements to be operated, thereby resulting in high manufacturing costs, which are particularly crucial in the field mass produced bicycle accessories.

Furthermore, an actuating device for bicycle brakes is known from German Published, Non-Examined Patent Application DE- A-33 03 586, wherein a receiving cylinder is also disposed between two brake lever parts that are pivotally mounted on a bicycle frame, and wherein the increase of the working fluid pressure in a pressure chamber results in an increase of the total length of the-receiving cylinder-piston unit, so that the brake lever parts are again pivoted and result in a braking action. In that known device, too, the receiving cylinder-piston unit is specially designed for use with brake lever parts. A special, different type of design of the receiving cylinder-piston unit is required for use with other components or with brake lever parts of different lever arm lengths, because of which the manufacturing costs for this device are also relatively high.

SUMMARY OF THE INVENTION

It is an object of the present invention to provide a hydraulic actuating device that can be used without any special adaptation measures for the actuation of a plurality of different devices which are to be actuated by a mechanical force.

In accordance with the invention, this object is attained in that the cylinder housing part is directly connected with a first component of a device to be actuated (e.g., brake, wheel hub, shift) by a connecting extension, and the piston is mechanically connected by a traction element with a second component of the device to be actuated, which is movable in relation to the first component. In this way it is possible to use the actuating device of the invention with different devices, which are to be operated by means of mechanical force, by connecting it by traction elements with one of the two components which can be moved relative to each other. Thus, the hydraulic actuating device in accordance with the invention can be produced in large quantities and can nevertheless be employed over a great range of uses without the need for special adaptations of the actuating device of the invention. The connection between the actuating device and the second component can be provided in a particularly simple manner in that the piston is directly connected with the second component by a traction cable. Accordingly, no further force transfer means are needed, so that the connection of the device of the invention with, for example, a bicycle brake or the like can be made without any great efforts.

An advantageous arrangement results if the traction cable has a nipple on one of its ends, which is supported on the piston, and the other end of which freely projects from the receiving cylinder for a connection, in particular by clamping, with the second component of the device to be actuated. Furthermore, the traction cable can freely rotate in respect to the piston with its end section connected to the piston, so that no torsional forces build up in the traction cable, which might possibly hamper the operational capabilities of the actuating device in accordance with the invention.

The invention further relates to a piston-cylinder unit for a pressure fluid actuating device, in particular of two-wheeled vehicles or the like, for delivering a fluid under pressure by means of a relative movement between two manually operated components, or for receiving this fluid and the mechanical operation of two components which are to be moved relative to one another. The unit includes a cylinder housing part that defines a cylinder chamber having an axis, the cylinder chamber being closed on one of its axial ends by a cylinder bottom, a piston axially displaceable in the cylinder recess, a pressure chamber formed between a front face of the piston facing the cylinder bottom and the cylinder bottom, and a hydraulic pressure line leading to the pressure chamber for the supply of working fluid into the pressure chamber and for the removal of working fluid from the pressure chamber. The cylinder housing part is connected with a first one of the two components to be actuated, and the piston is connected with a second one of the two components.

The piston has an interior recess parallel to the cylinder axis and open toward the cylinder bottom, which is closed by a piston bottom of the piston at the end of the interior recess facing away from the cylinder bottom. A guide element, which is parallel to the cylinder axis and has a guide section projecting beyond the cylinder bottom and extending into the interior recess, is disposed on the cylinder bottom. The dimension of the guide section parallel to the cylinder axis is greater than a maximum stroke of the piston in the cylinder chamber. Holes extending through the guide element and the cylinder bottom and aligned with one another receive a traction element that is connected between the piston and the second component of the device to be actuated.

Because of the special design of the piston-cylinder unit of the invention, it is possible to connect it on the one hand by the cylinder housing part with the respective components of the device to be operated and, on the other hand, to connect the traction element connected with the piston with the respective component of device to be operated, wherein again the piston-cylinder unit need not be specially designed for a particular device to be operated and instead can be used with a plurality of different devices. Many of these devices, such as brakes and gearshifts, are customarily already designed from the start for actuation by a traction element, in particular Bowden cable elements, so that it is only necessary to fix the Bowden traction core wire to the piston, with a simple support of the cylinder housing part on the support part for the Bowden cable sheath. This makes possible the production of the piston-cylinder unit of the invention in great numbers so that the production costs of the units can be significantly reduced.

In a particularly simple manner, the piston can be connected with the second component by a traction cable.

If the piston bottom has a hole which is aligned with the hole in the guide element, and if the hole in the piston has a section of an enlarged diameter on the front face of the piston facing away from the cylinder bottom, and an end of the traction element connected with the piston has a section of an enlarged diameter which at least partially is disposed in the section with the enlarged diameter in the piston bottom, the traction cable can be connected with the piston in a simple manner, wherein the traction cable is freely rotatable in respect to the piston because of the special type of connection, so that no torsional forces which might hamper the operational capabilities of the piston-cylinder unit can build up in the traction cable.

A particularly desirable embodiment of the cylinder housing part in the guide element can be achieved by making the guide element in one piece with a bottom section which constitutes at least a part of the cylinder bottom. In this case it is advantageous if an opening with an internal thread is provided in the cylinder bottom and if an external thread is provided on the bottom section for screwing the bottom section into the housing part. The cylinder housing part and the guide element with the cylinder bottom can be produced as separate parts and assembled in a simple manner. In this way it is possible in particular to produce the guide element with the bottom section and the cylinder housing part of different materials which are, respectively, adapted to the particular force effects on the two components.

In order to be able, with an embodiment of the cylinder housing part and the guide element with the bottom section as two separate parts, to dispose them in a defined position in respect to each other, it is proposed to provide an insertion-limiting stop extending radially outward on the bottom section.

To connect the cylinder housing part with the first component, it is also proposed to provide a connecting element on an outer surface of the cylinder bottom. The connecting element, preferably, comprises a neck extending axially of the cylinder and having a hole which is aligned with the hole in the cylinder bottom. The traction element passes through the hole in the connecting element and is directly connected with the second component. The force exerted by the piston-cylinder unit of the invention for actuating the first and second components is thus exerted essentially concentrically by the traction element and the connection element which surrounds it, so that no lever effect exists between the traction element and the connecting element which possibly might result in tilting or a lateral force effect on the piston-cylinder unit. Thus, it is possible to achieve a particularly stable construction by making the connecting element unitary with the cylinder bottom.

The piston-cylinder unit may be connected with the first and second components by a sheath section of a Bowden cable, one end of which is fastened to the connecting element and the other end to the first component. The traction element extends through the sheath section of the Bowden cable and forms the core of the Bowden cable. The Bowden cable connection permits the piston-cylinder unit of the invention to be located remote from the first and second components. Thus it is possible to house the piston-cylinder unit at a location where on the one hand it least affects the visual appearance and, on the other, best serves the functionality of the bicycle or the like.

Alternatively, the cylinder housing part may be installed in an opening in the fastening section of the first component by means of a connecting element on the first component, the first component resting against a stop shoulder in the area of the cylinder bottom. This provides a simple way of directly connecting the housing part to the first component, and because of a tensile load of the piston-cylinder unit of the invention, the housing part is held securely in the receiving opening in the fastening section.

It is, furthermore, possible to provide an external thread on the connecting element and an opening with an internal thread on a fastening section of the first component for providing a screw connection between the connecting element and the first component. In this way the cylinder housing part can be fixedly connected with the first component, wherein it is possible, because of the threaded connection of the first component with the cylinder housing part, to set the relative position of these two elements with respect to each other by appropriate turning of the cylinder housing part in the internal thread of the first component and thus to make a simple adjustment of the first and second components in relation to each other.

To assure, in the course of draining of the working fluid out of the pressure chamber formed in the cylinder housing part, that there is always a remaining volume to which the working fluid can be added during a subsequent actuation so that the pressure effect of the cylinder is sufficiently great from the start, it is proposed to provide on the front face of the piston facing the cylinder bottom and/or on the cylinder bottom an annular projection surrounding the interior recess in the piston and axially extending from the front face of the piston.

Alternatively, the guide section may be designed in such a way that it has a length parallel to the axis of the cylinder which is greater than the axial size of the interior recess in the piston. Because of this, when working fluid is drained from the pressure chamber, the piston can only move so far in the direction of the cylinder bottom until the guide element hits the piston bottom, so that in this case, too, a remaining volume for the subsequent introduction of the working fluid is maintained.

To prevent the escape of working fluid between the piston and the cylinder housing part, it is proposed to provide a groove extending in the circumferential direction in an exterior circumferential surface of the piston for receiving a first sealing element.

Furthermore, to prevent the escape of the working fluid between the piston and the guide element and through the respective holes, it is proposed to provide a groove extending in the circumferential direction in an interior circumferential surface of the interior recess in the piston and/or in an exterior circumferential surface of the guide element for receiving a second sealing element. The seal between the guide element and the piston assures in this case that the escape of working fluid through the holes can be prevented in every axially displaced position of the piston.

To prevent the piston from being displaced out of the cylinder housing part and to ensure that the guide section always remains at least partially in the interior recess of the piston, a stroke-limiting stop element for the piston may be provided in the area of an open end of the cylinder recess in the cylinder housing part. For example, a groove extending in the circumferential direction may be provided for receiving a snap ring in an interior circumferential surface of the cylinder recess of the cylinder housing part in the area of the open end of the cylinder recess. The snap ring can be inserted in a simple manner into the interior circumferential surface during the assembly of the piston-cylinder unit of the invention after insertion of the piston into the cylinder housing part and can subsequently, for example for maintenance on the piston-cylinder unit, again be removed from the groove so that the piston can be taken out of the cylinder housing part.

For a better understanding of the invention, reference may be made to the following description of exemplary embodiments, taken in conjunction with the accompanying drawings.

DESCRIPTION OF THE EMBODIMENTS

Figures 1, 2:
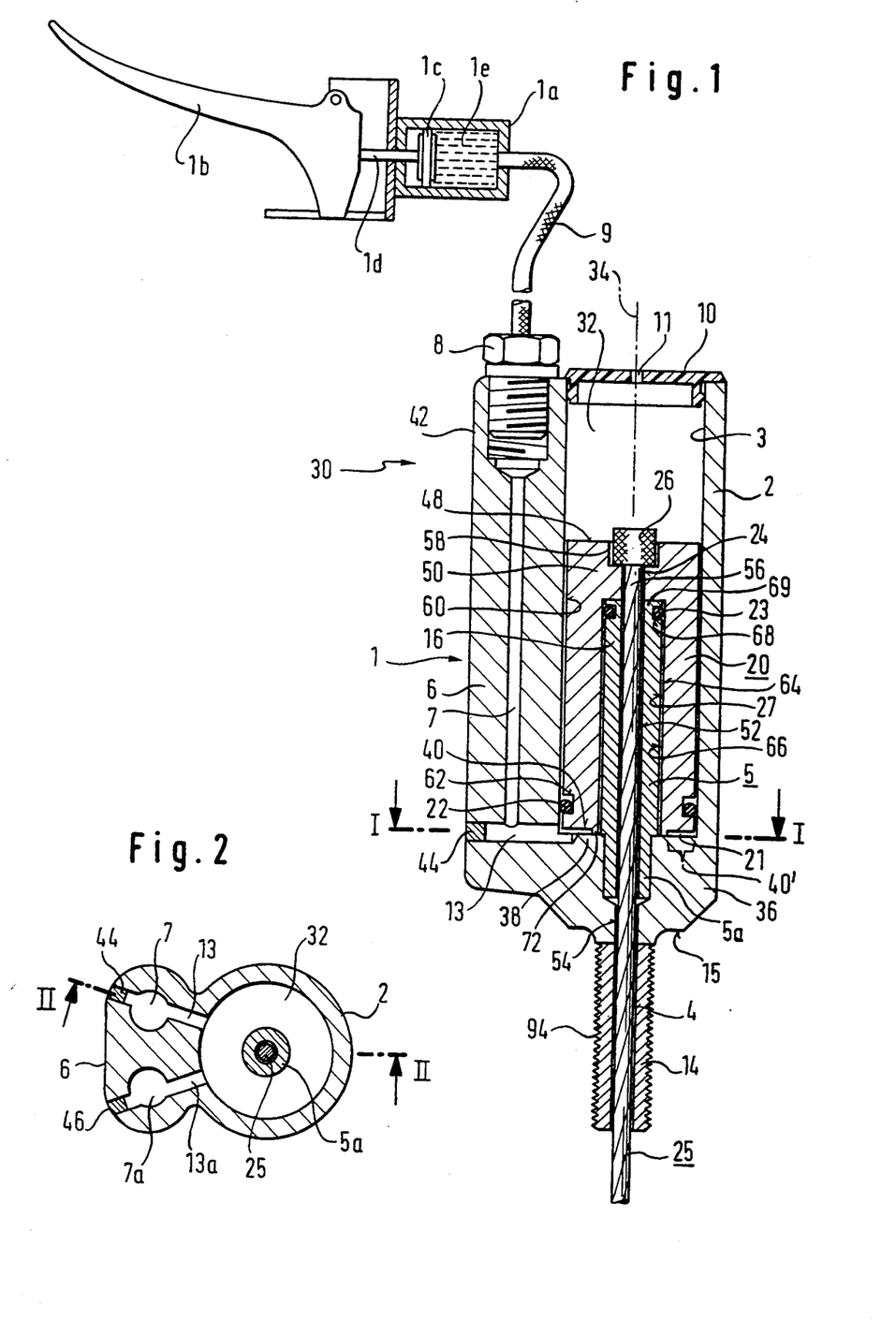
FIG. 1 is a generally schematic longitudinal cross-sectional view of a first embodiment of a hydraulic actuating device in accordance with the invention taken along the line II—II of FIG. 2.
FIG. 2, a cross-sectional view taken through a receiving cylinder of the embodiment of FIG. 1 along the line I—I in FIG. 1.

Referring to FIG. 1, an embodiment of the actuating device 30 comprises an actuating lever 1b, which can be a brake lever, for example, suitably attached in the grip area of a bicycle handlebar, and a transmitting cylinder 1a, in which a piston 1c is displaceably disposed. The piston 1c is connected with the actuating lever 1b by a piston rod 1d, so that by moving the actuating lever 1b, the piston 1c in the cylinder 1a is displaced to increase or decrease of the volume of a pressure chamber 1e. The pressure chamber 1e of the cylinder 1a is filled with a working fluid. In the hydraulic actuating device shown in FIG. 1, the cylinder 1a is used as a transmitting cylinder and delivers working fluid under pressure through a flexible pressure line 9 to a receiving cylinder 1 when the actuating lever is moved.

The receiving cylinder 1 comprises a cylinder housing part 2 that defines an elongated cylinder chamber 32 having an axis 34. The cylinder chamber 32 is closed at one axial end 36 of the cylinder housing part 2 by a cylinder bottom 38. A piston 20 is disposed for displacement in the axial direction in the cylinder chamber 32. A pressure chamber 21 is defined between a front face 40 of the piston 20, which faces the cylinder bottom 38 and the cylinder bottom 38. Working fluid is supplied to, or removed from, the pressure chamber through a fluid supply conduit, which is formed by bores 7 and 13 in a supply housing portion 6 of the cylinder housing part 2. The bore 7 is disposed in the cylinder housing part 2 in such a way that it extends essentially parallel with the axis 34 of the cylinder chamber 32, and a connecting element 8 for connecting the pressure line 9 with the fluid supply conduits 7, 13 is installed on an end 42 of the cylinder housing part 2 opposite the piston bottom 38.

A fluid supply conduit can be provided in a simple way by means of the bores 7 and 13 which are in communication with each other, wherein the bore 13 which essentially extends radially of the cylinder chamber 32, as can be seen particularly in FIG. 2, is closed at its end remote from the chamber 32 by a plug 44.

Bores 7a, 13a, which are similar to the bores 7, 13, are provided in the housing part 2, the bore 13a being closed by a plug 46. The bores 7a, 13a constitute a vent passage that leads from the pressure chamber 21 to the upper end 42 of the cylinder housing part 2 and is normally closed by, for example, a vent screw (not visible in the drawing figure).

A guide element 5 mounted on the cylinder bottom 38 has a guide portion 16 that extends parallel to (or coincident with) the cylinder axis 34 into the cylinder chamber 32. An interior recess 27 is provided in the piston 20 and is open toward the front face 40 of the piston opposite the cylinder bottom 38. The interior recess 27 is closed by a piston bottom 50 at its end facing away from the cylinder bottom 38. The cross section of the interior recess 27 corresponds essentially to the cross section of the guide portion 16 of the guide element 5, and the guide portion 16 extends at least partially into the interior recess 27.

Holes 24, 52 and 54 that are aligned with each other and are substantially parallel to or coincident with the cylinder axis 34 are provided in the piston bottom 50, in the guide element 5 and in the cylinder bottom 38, respectively. A traction element, for example a traction cable 25, extends through the holes 24, 52 and 54. On one end 56, the traction cable 25 has a section 26 of an enlarged diameter, for example a nipple 26, which is disposed in a corresponding cavity 58 in the front face 48 of the piston bottom 50. The traction cable 25 is used to connect the piston 20 to a device to be actuated, as described in detail below.

A neck 14 with a hole 4 that is aligned with the hole 54 in the cylinder bottom is provided on the side of the cylinder bottom 38 opposite the cylinder chamber, and the traction cable passes through the hole 4. The neck 14, as described below, provides for the mounting of the receiving cylinder on the device to be actuated.

To prevent the escape of the working fluid from the pressure chamber 21 between the external circumferential surface 60 of the piston 20 and the internal circumferential surface 3 of the cylinder chamber 32, a circumferential groove 62 is provided in the external circumferential surface 60 of the piston 20, in which a sealing element, for example an elastic seal ring 22, is disposed. The seal ring 22 assures a tight closure between the external circumferential surface 60 of the piston 20 and the internal circumferential surface 3 of the cylinder chamber 32.

Furthermore, to prevent escape of the working fluid from between the internal circumferential surface 64 of the piston recess 27 and the external circumferential surface 66 of the guide portion 16 of the guide element 5 and through the holes 52, 54 and 4, a circumferential groove 68 is provided in the external circumferential surface 66 of the guide element 5 near the end 69, in which a sealing element, for example an elastic seal ring 23, is disposed.

When the actuating lever 1b of the transmitting cylinder is moved to displace the piston 1c along the cylinder 1a in a direction to provide fluid delivery from the transmitting cylinder 1a, working fluid flows through the pressure line 9 and the fluid supply conduits 7, 13 into the pressure chamber 21 in the receiving cylinder 1. The flow of pressurized working fluid into the chamber 21 displaces the piston 20 in a direction toward the end 42 of the cylinder housing part 2, which produces a simultaneous displacement of the traction cable 25. Thus, the traction cable 25 moves in relation to the neck 14, and this relative movement is used in a manner described below for the actuation of two components of the device to be actuated, which move relatively to one another.

The seal ring 23 on the guide element 5 assures a tight seal of the pressure chamber in respect to the holes 52, 54 and 4 in every axial position of the piston 20 in the cylinder chamber 32. To this end, it is necessary that the length of the guide portion 16 of the guide element 5 extending into the interior recess 27 be greater than the maximum stroke of the piston 20 in the cylinder chamber 32 and that the seal ring 23 be disposed as close as possible to the end 68 of the guide portion 16 which is remote from the piston bottom 38. When the actuating lever 1b is released, the piston is returned in the direction of the cylinder bottom 38, for example by the energy stored in a spring, not shown, of the device actuated by the receiving cylinder.

An annular projection 72 on the front face 40 of the piston 20 surrounding the interior recess 27 in the piston 20 prevents the front face 40 from resting with its entire surface on the cylinder bottom 38. In this way the fluid introduced into the pressure chamber 21 is evenly distributed over the entire surface of the front face 40 of the piston 20 in the course of a subsequent actuation by the actuating lever 1b, and provides a uniform force of the face 40 from the start of the introduction of the working fluid into the pressure chamber 21.

As can further be seen in FIG. 1, the guide element 5 has an end section 5a which is received in a corresponding recess in the cylinder bottom and is fixed in this recess, for example by gluing, soldering or the like.

The end of the cylinder chamber 32 opposite from the bottom 36 is closed by a cover 10 in the area of the end 42 of the cylinder housing part 2. The cover 2 prevents dirt and dust from entering the interior of the cylinder chamber 32 and thereby from hampering the free movement of the piston 20 in the cylinder chamber 32. A vent opening 11 is provided in the cover 10, through which air can flow in and out of the chamber during movements of the piston 20. In this way, pressure changes in the section of the chamber 32 between the piston 20 and the cover 10 during movements of the piston 20, which would affect the functional capability of the receiving cylinder 1, are prevented.

Figure 3:
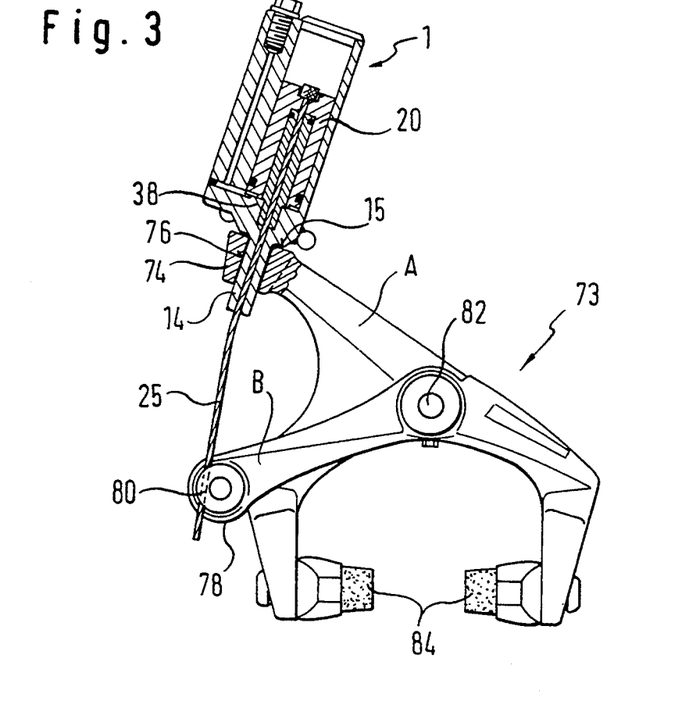
FIG. 3 is an elevational view, with portions broken away in cross section, of a receiving cylinder in accordance with the invention coupled to a bicycle brake.
Figure 4:
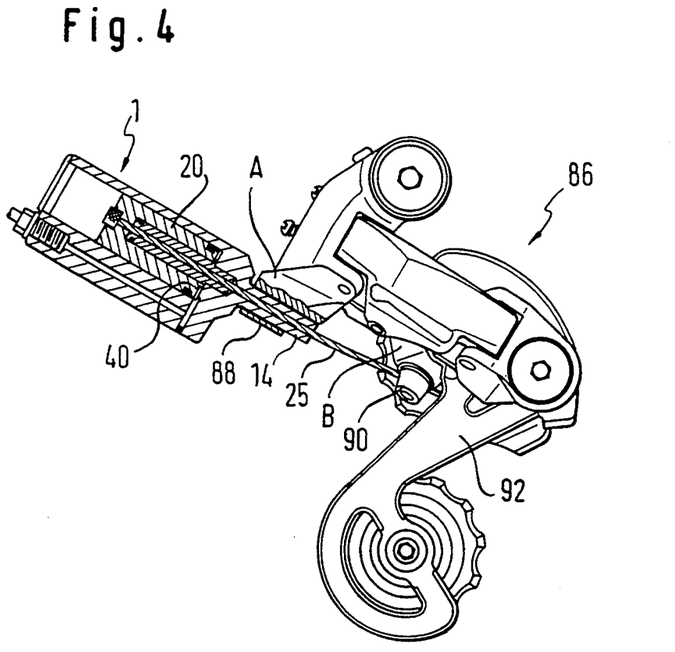
FIG. 4 is and elevational view, with portions broken away in cross section, of a receiving cylinder in accordance with the invention coupled to a derailleur.

Examples of the use of the receiving cylinder of the invention are illustrated in FIGS. 3 and 4, respectively. In FIG. 3, the receiving cylinder 1 is employed with a caliper-type rim brake 73 of a bicycle. Such rim brakes are per se well known to those skilled in the art and a detailed description need not be provided here. A first brake lever arm A of the rim brake 73 has a fastening section 74 in the form, for example, of a mounting hole 76. The neck 14 of the receiving cylinder 1 is received in the hole 76 and rests with a shoulder 15 engaged against the fastening section 74 of the brake lever arm A. The position of the receiving cylinder 1 relative to the brake lever arm 1 can be set, for example, by shims (not shown) between the shoulder 15 and the fastening section 74 of the arm A.

A second brake lever arm B has a second fastening section 78, to which the traction cable 25 is secured, for example, by a clamping screw 80. Upon actuation of the actuating lever 1b and the movement of the piston 20 away from the cylinder bottom 38 connected therewith, the two fastening sections 74, 78 of the brake lever arms A, B are moved toward each other, based on the relative movement between the neck 14 and the traction cable 25, because of which the brake lever arms A, B are pivoted around a pivot axis 82 and the brake shoes 84 are brought in contact with a rim, not shown. The frictional force generated between the rim and the brake shoes 84 results in braking.

It is possible by a suitable selection of the ratio of the interior cross-sectional area of the delivery cylinder 1a to the area of the annular piston face 40 of the piston 20 of the delivery cylinder, which is equal to the cross-sectional area of the cylinder 32 minus the cross-sectional area of the interior recess 27 of the piston 20, to increase the force introduced into the cylinder 1a through the actuating lever 1b. To this end, the annular piston face area is made larger than the cross-sectional surface of the piston 1c in the cylinder 1a. Although, when the actuating lever 1b is operated, the stroke of the piston 20 will be less than the stroke of the piston 1c, caliper-type rim brakes of this type do not require a large stroke or a large pivot movement of the brake lever arms A and B.

In FIG. 4, the receiving cylinder of the invention is shown with a chain thrower 86 of a derailleur of a bicycle. Chain throwers of this type are known from the prior art, and a detailed description here is not necessary and not provided. The chain thrower 86 has two components A, B, which are to be moved in relation to each other, the component A having a first fastening section 88 into which the neck 14 of the receiving cylinder 1 can, for example, be inserted in a manner analogous to FIG. 3. A clamping screw 90 is again provided on the second component B, by means of which the traction cable 25 is fastened to the component B.

When the actuating lever 1b (FIG. 1) is moved, the components A and B are moved toward each other because of the relative movement between the neck 14 of the receiving cylinder 1 and the traction cable 25. By means of the coupling mechanism, known per se, of such chain throwers, a chain guide section 92 is then laterally pivoted, i.e. orthogonally to the plane of the paper in FIG. 4, which results in switching between different steps of sprockets.

With such chain throwers, in particular with sprockets of, for example, seven or eight sprocket wheels on one rear wheel hub, a large lateral travel of the chain guide section 92 is required. This can be achieved in a manner analogous to FIG. 3 in that the annular piston face area 40 in the receiving cylinder piston 20 is made smaller than the cross-sectional surface of the piston 1c in the transmitting cylinder 1a. Although in such a case the actuating force of the receiving cylinder 1 is reduced in relation to the force introduced into the receiving cylinder, the chain throwers 86 for derailleurs do not require a large force for operation.

Instead of inserting the neck 14 of the receiving cylinder 1 into the fastening sections 74, 88 of the rim brake 73 or the chain thrower 86, it is also possible to provide an exterior thread 94 (FIG. 1) on the neck 14 and to provide an interior thread in the respective openings in the fastening sections 74 or 88 for screwing the neck 14 into the respective fastening section. Thus it is possible to attach the receiving cylinder 1 on the fastening section so that it is adjustable in its position relative to the respective lever arm and can be secured against unintentional loosening from the respective fastening section by a lock nut, for example. In this way, it is possible to fix the position of the receiving cylinder in relation to the respective component, by means of which it is also possible to adjust the position in relation to each other of the two components to be actuated.

Figure 5:
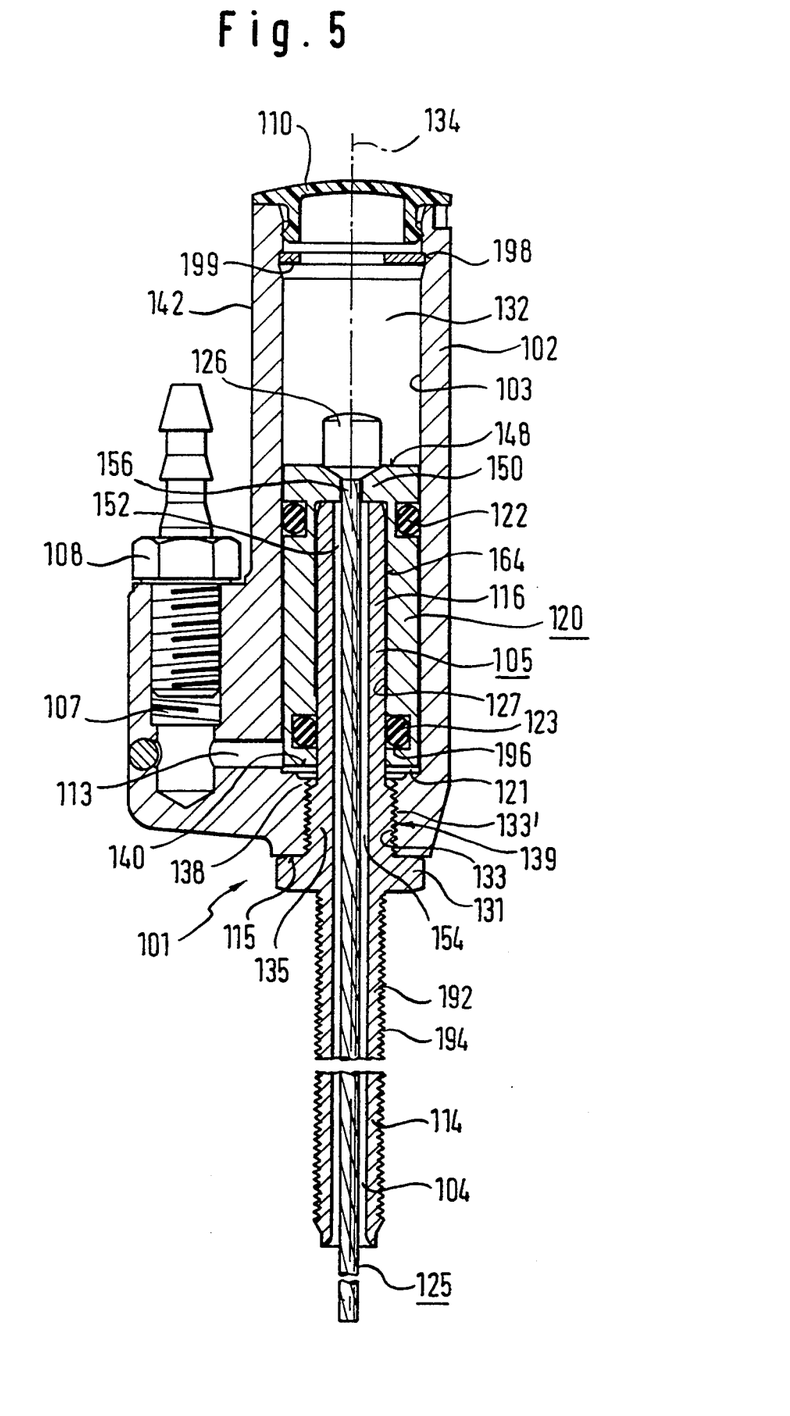
FIG. 5 is a longitudinal cross-sectional view corresponding to FIG. 1 of a second embodiment of the receiving cylinder in accordance with the invention.

A second embodiment of the receiving cylinder is illustrated in FIG. 5. The components of FIG. 5 which correspond to the components in FIG. 1 have been designated by the same reference numerals, increased by 100. In the embodiment of FIG. 5, only the guide part 105 and the neck 114 differ from FIG. 1. The remaining structure of the receiving cylinder 101 essentially corresponds to the construction of the receiving cylinder 1, so that regarding its construction reference is made to the above description in connection with FIGS. 1 and 2.

As can be seen in FIG. 5, a hole 139 is provided in the cylinder bottom 138, which has a somewhat larger cross section than the hole 54 of the cylinder bottom 38 of FIG. 1. An internal thread 133' is provided on the wall of the hole 139. The guide element 105 has a section 135 with an external thread 133 that is screwed into the hole 139; the section 135 thus forms a part of the cylinder bottom 138.

An annular, outwardly extending flange portion 131 on the guide element 105 engages a stop surface 115 when the guide element 105 is screwed into the hole 139. Such engagement ensures the accuracy of assembly of the receiving cylinder 101 and makes the assembly easier.

The guide element 105 is unitary with the neck 114, which has a section 192 extending to the outside of the cylinder chamber 132 through an opening 139. The receiving cylinder 101 can be attached to the respective component to be actuated by means of the neck 114, as described above and shown in FIGS. 3 and 4. The neck 114 of FIG. 5 has an external thread 194 that permits it to be screwed into a connecting opening of a fastening section with an interior thread, for example. By providing a lock nut, not shown in the drawing figures, it is possible to fix the entire receiving cylinder 101 in a selected position relative to the fastening section by rotating the neck 114 in the receiving opening (not shown) of the component, and it can be fixed in any desired position by the lock nut. In this way an adjustment of the positions of the components which are to be moved towards each other becomes possible.

As can be seen in FIG. 5, the seal ring 123 is disposed in a circumferential groove 196 in the internal surface 164 of the interior recess 127 in the piston 120. In this way the seal rings 122, 123 are both provided on the piston 120. Furthermore, a circumferential groove 198, in which a snap ring 199 is disposed, is provided in the area of the end 142 of the cylinder housing part 102 in the interior circumferential surface 103 of the interior chamber 132. The snap ring 199 forms a stroke-limiting stop for the piston 120, so that the piston cannot be displaced so far that it is dislodged from the guide element 105.

As can further be seen in FIG. 5, no annular projection corresponding to the annular projection 72 in FIG. 1 is provided on the front face 140 of the piston 120. In the lowest piston position of the embodiment illustrated in FIG. 5 there is a remaining volume of the pressure chamber 121 formed between the cylinder bottom 138 and the piston 120, because the length of the guide section 116 extending into the cylinder chamber 132 is greater than the length of the interior recess 127 in the piston 120. In this piston position, the piston bottom 150 rests against the guide section 116, because of which the further movement of the piston 120 in the direction toward the cylinder bottom 138 is blocked.

The embodiment of FIG. 5 has the advantage that the guide element 105 with the bottom section 135 and the neck 114 can be manufactured as a separate part and that it is therefore possible to use a different material for the guide element 105 than for the cylinder housing part 102. Exterior forces act on the neck 114, so that it is advantageous to make it of a harder material than the cylinder housing part 102. For example, the guide element 105 with the bottom section 135 and the neck 114 can be manufactured of steel, and the cylinder housing part of a light metal such as aluminum. The total weight of the receiving cylinder of the invention is relatively low, while it is sufficiently strong.

Because of the provision of the seal ring 123 on the piston 120, no steps for providing such a sealing ring on the guide element 105 need to be taken, so that the manufacture of the guide element 105 consisting of a harder metal can be simplified.

The hydraulic actuation devices in accordance with the invention allow the employment of one and the same actuation device in different devices to be actuated. Such devices to be actuated comprise, for example, gearshifts or brakes of bicycles. The receiving cylinder of the hydraulic actuating device of the invention can be attached in a simple manner to the respective devices to be actuated, and the type of attachment essentially corresponds to the attachment of a Bowden cable sheath which had been used up to now. In this way the employment of the actuating device of the invention is also possible with brakes or gearshifts already installed on a bicycle, for example. This is additionally aided by the respective disposition of the pressure line and the neck or traction cable in the axial direction of the receiving cylinder in the area of the receiving cylinder. If necessary, the pressure line can be fixed on the frame of the two-wheeled vehicle by means of the fastening element provided for the Bowden cable. However, it is also possible to guide the pressure line away from the cylinder housing part at an angle in respect to the traction cable which is different from 180°.

The receiving cylinder 1 or 101, illustrated in FIGS. 1 to 5 and described in detail above, can also easily be used as a transmitting cylinder in an actuating device, in particular in place of the transmitting cylinder 1a of FIG. 1. To do this it is only necessary to connect the corresponding actuating handle with the piston 20 or 120 via the traction cable, along with a corresponding hinging of the actuating handle on the handlebar in such a way that the traction cable is stressed by tension when the handle is actuated.

Since one and the same receiving cylinder can be used for a plurality of applications, the costs for manufacturing the actuation device in accordance with the invention can be significantly reduced because of mass production. Different delivery cylinders, having areas that provide the desired stroke ratio for different applications of the same delivery cylinder, can be used for different applications.

Based on the selection of the effective cross-sectional surfaces of the pistons of the delivery cylinder and the receiving cylinder, the hydraulic actuation device can easily be adapted in a simple manner to different requirements which, for example, can include a large force of the receiving cylinder with a short stroke or a relatively small force of the receiving cylinder with a long stroke.

Use of the actuation device of the invention makes it possible, moreover, to replace the Bowden cable transmissions, which have been customary on bicycles up to now, to a large extent with the pressure lines of the actuating device, thus removing the frictional force losses of the Bowden cable device which occur, particularly with a multitude of turns. With a clearly reduced actuating force, the devices operated by means of the actuating devices in accordance with the invention therefore exhibit a considerably improved or strengthened effect (for example braking effect) with great dependability, even after prolonged use.

We claim:

1. A hydraulic actuating device for brakes and gearshifts on bicycles, comprising an actuating lever, a transmitting cylinder coupled to the actuating lever, a receiving cylinder for converting the displacement of the transmitting cylinder by the actuation of the actuating lever into displacement of the receiving cylinder in accordance with the ratio of the areas of the transmitting cylinder and the receiving cylinder, and a flexible pressure line communicating the transmitting cylinder and the receiving cylinder, wherein the receiving cylinder includes a cylinder housing part and a piston; the cylinder housing part being directly connected with a first fastening section of a first component of a device to be actuated by a connecting extension and being stationary with respect to the first component upon actuation of the actuating lever, and the piston being mechanically connected by a traction element with a second fastening section of a second component of the device which is movable in relation to the first component for generating a pulling force between the first and second fastening portions in order to reduce the distance between the first and second portions upon actuation of the actuating lever.

2. The hydraulic actuating device in accordance with claim 1, wherein the piston is directly connected with the second component by a traction cable.

3. The hydraulic actuating device in accordance with claim 2, wherein the traction cable has a nipple on one end engaging the piston, and wherein another end of the traction cable extends from the receiving cylinder for a connection with the second component of the device to be actuated.

4. A piston-cylinder unit for a pressure fluid actuating device of two-wheeled vehicles for delivering a fluid under pressure by means of a relative movement between two manually operated components, or for receiving a fluid and the mechanical operation of two components which are to be moved relative to one another, comprising a cylinder housing part with a cylinder chamber having an axis, the cylinder chamber being closed on one of its axial ends by a cylinder bottom, a piston axially displaceable in the cylinder chamber, a pressure chamber formed between a front face of the piston facing the cylinder bottom and the cylinder bottom, and a hydraulic pressure line communicating with the pressure chamber for the supply of working fluid into the pressure chamber and for the removal of the working fluid from the pressure chamber, wherein the cylinder housing part is connected with a first one of the two components and the piston is connected with a second one of the two components, wherein the piston has an interior recess parallel to the cylinder axis and open toward the cylinder bottom which is closed by a piston bottom of the piston at an end of the interior recess facing away from the cylinder bottom, a guide element which is parallel to the cylinder axis and has a guide section projecting beyond the cylinder bottom and extending into the interior recess and disposed on the cylinder bottom, the dimension of the guide section parallel to the cylinder axis being greater than a maximum stroke of the piston in the cylinder chamber, a guide element hole extending through the guide element and a cylinder bottom hole extending through the cylinder bottom, the guide element hole and cylinder bottom hole being in alignment with one another and receiving a traction element that is connected between the piston and the second component.

5. The piston-cylinder unit in accordance with claim 4, wherein the traction element is a traction cable.

6. The piston-cylinder unit in accordance with claim 4, wherein the piston bottom hole has a section of an enlarged diameter on a front face of the piston facing away from the cylinder bottom and an end of the traction element connected with the piston has a section of an enlarged diameter which at least partially is disposed in the section with the enlarged diameter of the piston bottom hole.

7. The piston-cylinder unit in accordance with claim 4, wherein the guide element is unitary with a bottom section which constitutes at least a part of the cylinder bottom.

8. The piston-cylinder unit in accordance with claim 7, wherein an opening with an internal thread is provided in the cylinder housing part and an external thread is provided on the bottom section for screwing the bottom section into the cylinder housing part.

9. The piston-cylinder unit in accordance with claim 8, wherein a stop flange extending radially outward is provided on the bottom section for engagement with the cylinder housing part.

10. The piston-cylinder unit in accordance with claim 4, wherein a connecting element for connecting the cylinder housing part with the first component is provided on the outside of the cylinder bottom.

11. The hydraulic actuating device in accordance with claim 10, wherein the connecting element has a neck extending in the direction of the cylinder axis and a connecting element hole which is aligned with the cylinder bottom hole, and the traction element passes through the connecting element hole and is directly connected with the second component.

12. The hydraulic actuating device in accordance with claim 10, wherein the connecting element is unitary with the bottom section.

13. The hydraulic actuating device in accordance with claim 10, wherein a sheath section of a Bowden cable is fastened at one end to the connecting element and at another end to the first component, and the traction element extends through the sheath section of the Bowden cable and forms a core of the Bowden cable.

14. The hydraulic actuating device in accordance with claim 10, wherein the cylinder housing part is received in an opening on a first fastening section of the first component by means of the connecting element on the first component, and the first component rests against a stop surface in the region of the cylinder bottom.

15. The hydraulic actuating device in accordance with claim 10, wherein an external thread is provided on the connecting element and an opening with an internal thread is provided on a fastening section of the first component for providing a screw connection between the connecting element and the first component.

16. The hydraulic actuating device in accordance with claim 4, wherein an annular projection on the piston surrounds the interior recess in the piston and axially extends from the front face of the piston toward the cylinder bottom.

17. The hydraulic actuating device in accordance with claim 4, wherein the axial length of the guide section is greater than the axial length of the interior recess in the piston.

18. The hydraulic actuating device in accordance with claim 4, wherein a groove extending in the circumferential direction is provided in an exterior circumferential surface of the piston for receiving a first sealing element.

19. The hydraulic actuating device in accordance with claim 4, wherein a groove extending in the circumferential direction is provided in at least one of an interior circumferential surface of the interior recess in the piston and an exterior circumferential surface of the guide element, and a second sealing element is received in the groove.

20. The hydraulic actuating device in accordance with claim 4, wherein a stroke-limiting element is provided for the piston in the area of an open end of the cylinder chamber in the cylinder housing part.

21. The hydraulic actuating device in accordance with claim 20, wherein a groove extending in the circumferential direction for receiving a snap ring is provided on an internal circumferential surface of the cylinder chamber of the cylinder housing part in the area of the open end of the cylinder chamber.

* * * * *

UNITED STATES PATENT AND TRADEMARK OFFICE
CERTIFICATE OF CORRECTION

PATENT NO. : 5,443,134
DATED : August 22, 1995
INVENTOR(S) : Joachim Gajek and Hannsjörg Stumpf It is certified that error appears in the above-indentified patent and that said Letters Patent is hereby corrected as shown below:

Col. 1, line 51, "field" should read --field of--;
Col. 5, line 56, "and" should read --an--;
Col. 6, line 4, "of the" should read --the--;
Col. 13, claims 11 through 21, "The hydraulic actuating device" should read -- The piston cylinder unit --.

Signed and Sealed this

Fifth Day of March, 1996

Attest:

BRUCE LEHMAN

*Attesting Officer*  *Commissioner of Patents and Trademarks*